(12) United States Patent
Shibuya et al.

(10) Patent No.: US 9,130,429 B2
(45) Date of Patent: Sep. 8, 2015

(54) ROTATING ELECTRICAL MACHINE (71) Applicant: KABUSHIKI KAISHA YASKAWA DENKI, Kitakyushu-shi (JP)

(72) Inventors: Takaaki Shibuya, Kitakyushu (JP); Mitsuru Iwakiri, Kitakyushu (JP); Manabu Harada, Kitakyushu (JP); Jun Kojima, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 338 days.

(21) Appl. No.: 13/760,067

(22) Filed: Feb. 6, 2013

(65) Prior Publication Data
US 2014/0035424 A1 Feb. 6, 2014

(30) Foreign Application Priority Data
Aug. 3, 2012 (JP) .................................. 2012-173065

(51) Int. Cl.
| H02K 1/00 | (2006.01) |
| H02K 3/32 | (2006.01) |
| H02K 3/28 | (2006.01) |
| H02K 3/18 | (2006.01) |

(52) U.S. Cl.
CPC .. *H02K 3/32* (2013.01); *H02K 3/18* (2013.01); *H02K 3/28* (2013.01)

(58) Field of Classification Search
USPC .......................... 310/179–185, 198, 200, 208
See application file for complete search history.

(56) References Cited

U.S. PATENT DOCUMENTS

| 7,126,246 | B2 * | 10/2006 | Izumi et al. .................... 310/208 |
| 2003/0052563 | A1 * | 3/2003 | Assmann et al. .............. 310/179 |
| 2005/0258702 | A1 * | 11/2005 | Michaels ....................... 310/179 |
| 2006/0087193 | A1 * | 4/2006 | Hyodo et al. .................. 310/198 |
| 2006/0197398 | A1 * | 9/2006 | Maynez ......................... 310/198 |
| 2008/0315705 | A1 * | 12/2008 | Obata et al. ................... 310/198 |
| 2011/0127872 | A1 * | 6/2011 | Podack ......................... 310/180 |

FOREIGN PATENT DOCUMENTS

| EP | 2026447 | 2/2009 |
| JP | 2000-156951 | 6/2000 |
| JP | 2003-164087 | 6/2003 |
| WO | WO 2007/141830 | 12/2007 |

OTHER PUBLICATIONS

Japanese Office Action for corresponding JP Application No. 2012-173065, Jun. 18, 2013.

* cited by examiner

*Primary Examiner* — Thanh Lam
(74) *Attorney, Agent, or Firm* — Mori & Ward, LLP (57) ABSTRACT

A rotating electrical machine includes a toric stator and a rotator located inside or outside the stator. The stator includes a plurality of teeth radially extending from the center of a circle of the stator with equal gap, and the plurality of coils arranged in order and in layers by the winding wire being turned a plurality of times around the circumference of each of a plurality of teeth. The number of turns of the two respective coils arranged on the circumference of the two adjacent teeth is different.

9 Claims, 7 Drawing Sheets

ROTATING ELECTRICAL MACHINE

CROSS-REFERENCE TO RELATED APPLICATIONS

The present application claims priority under 35 U.S.C. §119 to Japanese Patent Application No. 2012-173065, filed Aug. 3, 2012. The contents of this application are incorporated herein by reference in their entirety.

FIELD OF THE INVENTION

The present invention relates to rotating electrical machine such as an electric motor, and the like.

BACKGROUND ART

Conventionally, a stator used for an electric motor is provided with a plurality of teeth, wherein the respective plurality of teeth are provided with coils having the same shape and the same number of turns. The plurality of coils are shaped by a winding wire with the same number of turns being wound around (turned) in order and in layers on bobbins of the same shape (for example, refer to Japanese Unexamined Patent Application Publication 2000-156951).

SUMMARY OF THE INVENTION

According to one aspect of the present invention, a rotating electrical machine includes a toric stator and a rotator located inside or outside the stator. The stator includes a plurality of teeth radially extending from the center of a circle of the stator with equal gap, and the plurality of coils arranged in order and in layers by the winding wire being turned a plurality of times around the circumference of each of a plurality of teeth. The number of turns of the two respective coils arranged on the circumference of the two adjacent teeth is different.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Embodiment 1

Figure 1:
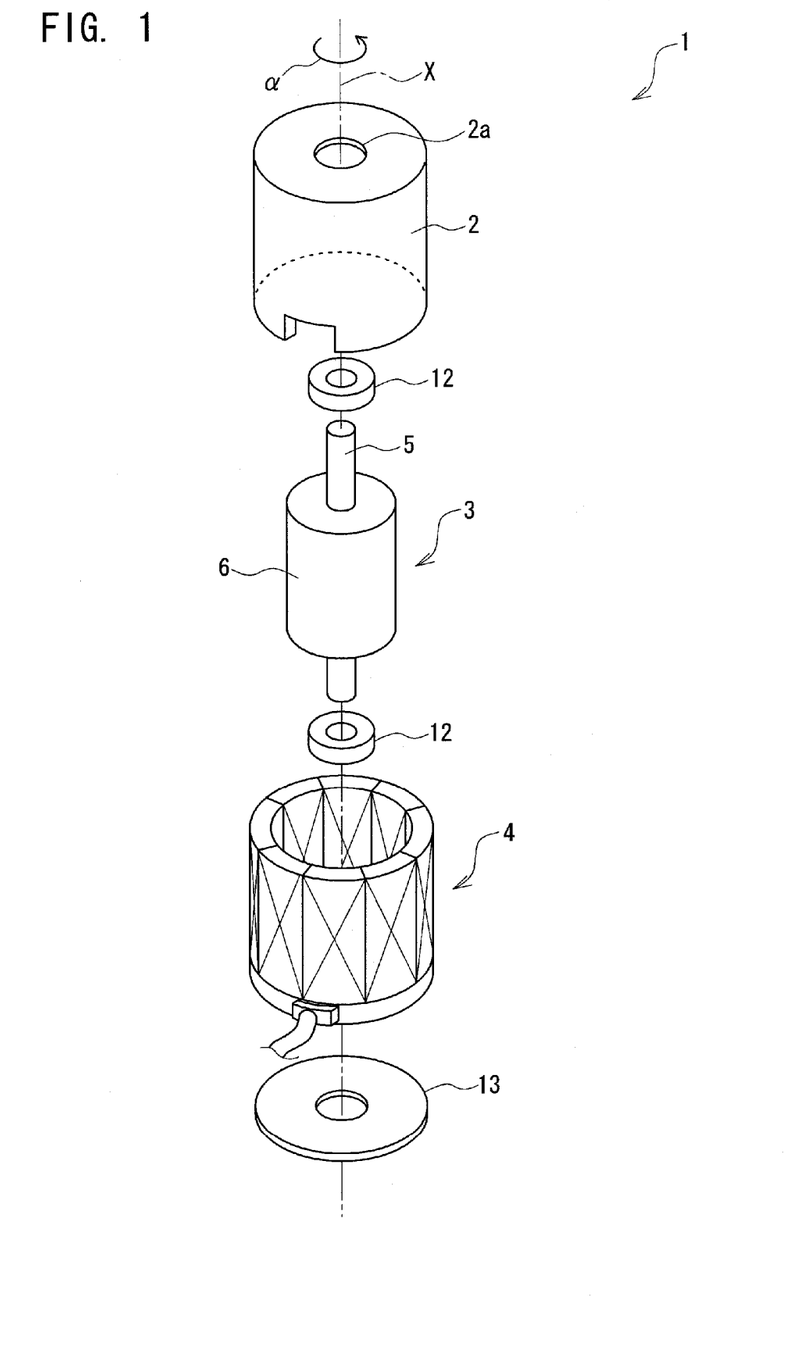
FIG. 1 shows an exploded perspective view of the motor related to Embodiment 1.

Hereinafter, a motor (electric motor) 1 as a type of rotating electrical machine related to Embodiment 1 is described with reference to the drawings. FIG. 1 is an exploded perspective view of the motor 1 related to Embodiment 1. The motor 1 is an inner rotor-type motor. Moreover, a permanent magnet is used in the rotor 3 as a magnetic field. The motor 1 includes a motor case 2, a rotor (rotator, inner rotor) 3, a bearing 12, and a stator (stator, outer stator) 4.

The motor case 2 is a casing configuring the outer wall of the motor 1 with a through hole 2a opening in the upper surface thereof. The rotor 3 is arranged as a field magnet inside the motor case 2. The rotor 3 includes a shaft 5 and a rotor core 6. The bearing 12 is arranged between the motor case 2 and the rotor 3. The rotor 3 includes ten permanent magnets seriately arranged such that the poles are alternately different and regarded as ten poles. The ten permanent magnets are circumferentially arranged along the circumference surface of the rotor 3.

The shaft 5 penetrates the center hole of the bearing 12 and the through hole 2a of the motor case 2. The outer ring of the bearing 12 is connected to the motor case 2 and by means of the inner ring of the bearing 12 connected to the shaft 5 of the rotor 3, the entire rotor 3 is made rotatable in the α direction of the arrow in the figure, revolving around the central axis X of the shaft 5 with respect to the motor case 2. The bearing 12 can be configured by being sandwiched between the motor case 2 and the rotor 3 without connecting the bearing 12 to the motor case 2 and/or the rotor 3. A bottom ring 13 covering the bottom surface of the motor case 2 is arranged below the rotor 3. The bearing 12 is also arranged between the rotor 3 and the bottom ring 13 such that it rotatably supports the rotor 3.

Moreover, in the present specifications, for convenience, the vertical direction in FIG. 1 is defined as the vertical direction in the motor 1, using names such as the upper surface, bottom surface, and the like. However, needless to say, the vertical direction is not limited to the vertical direction in FIG. 1, depending on the manner in which the motor is used.

Figure 2:
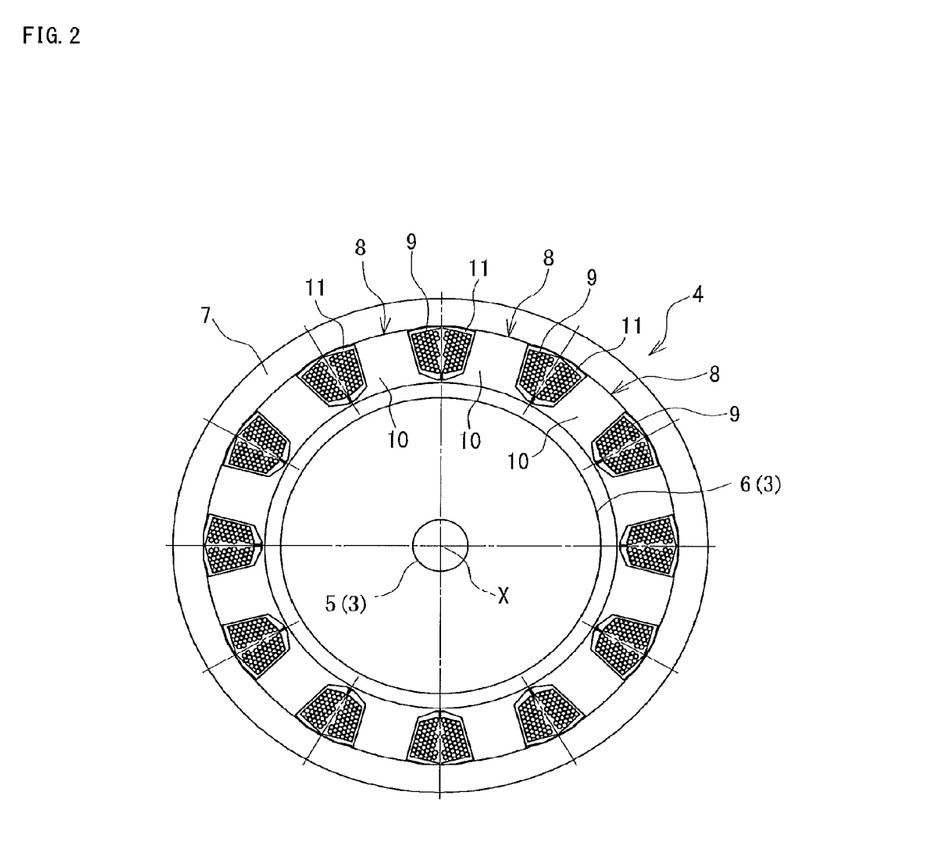
FIG. 2 shows a cross-section of the axial orthogonal plane of the stator with the rotor being arranged inside the stator shown in FIG. 1.
Figure 7:
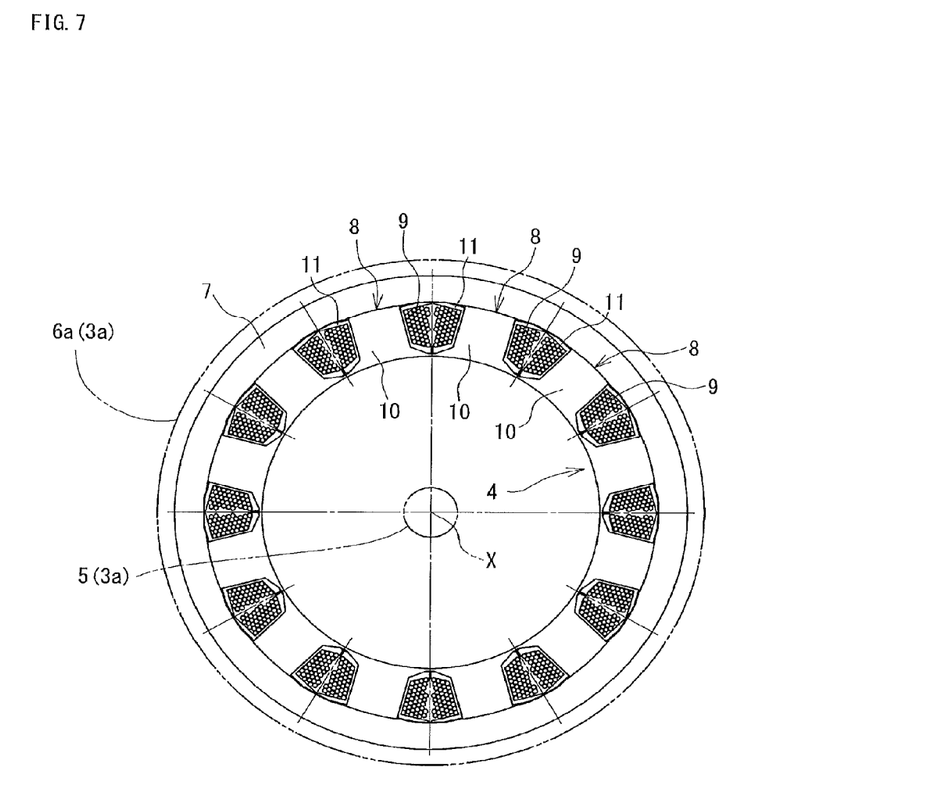
FIG. 7 shows a cross-section of the axial orthogonal plane of the stator with the rotor being arranged outside the stator according to another embodiment of the motor.

The stator 4 as an armature is arranged inside the motor case 2 such that it surrounds the rotor 3 from outside the rotor 3. FIG. 2 is a cross-section of the axial orthogonal plane of the stator 4. The overall cross-section of the stator 4 by the axial orthogonal plane is circular. The stator 4 includes a yoke 7 and a plurality of armature coils 8. The yoke 7 is a metal toric material supporting the outside of the armature coil 8. The armature coil 8 ensures a constant magnetic gap with the permanent magnet of the rotor 3, and is seriately as well as circumferentially arranged on the circumference of the rotor 3. For another example, a rotor 3a (rotator, outer rotor) includes the shaft 5 and a rotor core 6a, as shown in FIG. 7. The rotor 3a can be arranged outside of the stator 4, as shown with a double-dashed chain line in FIG. 7.

In the present Embodiment 1, the armature coil 8 includes one division core and a winding wire 9 wound around the division core. A principal part of the division core is teeth 10 radially extending from the center of the circle of the stator 4 (central axis X) with equal gap. The winding wire 9 is wound so as to surround the teeth 10. Specifically, the winding wire 9 is wound on a hollow-shaped bobbin 11 and this bobbin 11 is inserted into the teeth 10. In this stator 4, twelve armature coils 8 are circumferentially arranged. Accordingly, the angle gap between the adjacent armature coils 8 is 30°.

Moreover, in the present specifications, the winding wire 9 as a whole with the magnet wire wound a plurality of laps is also referred to as a coil 9. One spin of winding from among the coil 9 or the magnet wire corresponding to this is referred to as a turn. Moreover, the action of winding may also be referred to as a turn.

The respective armature coils 8 are connected to an alternating-current power supply corresponding to each phase from among: two-phase, three-phase, or more. When electricity of different phases is electrified in each phase, the rotor 3 rotates due to an electromagnetic induction function. In this Embodiment 1, the two adjacent armature coils 8 are connected to the alternating-current power supply of three phases: phase U, phase V, and phase W.

Figure 3A:
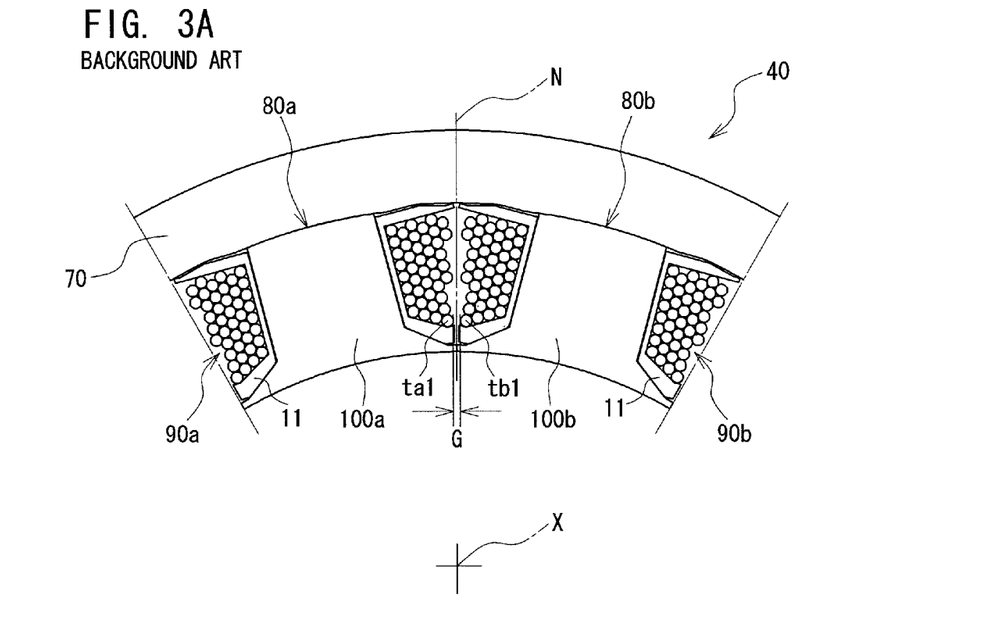
FIG. 3A shows a partial view on a large scale by a cross-section of the axial orthogonal plane of the stator and indicates a conventional stator.
Figure 3B:
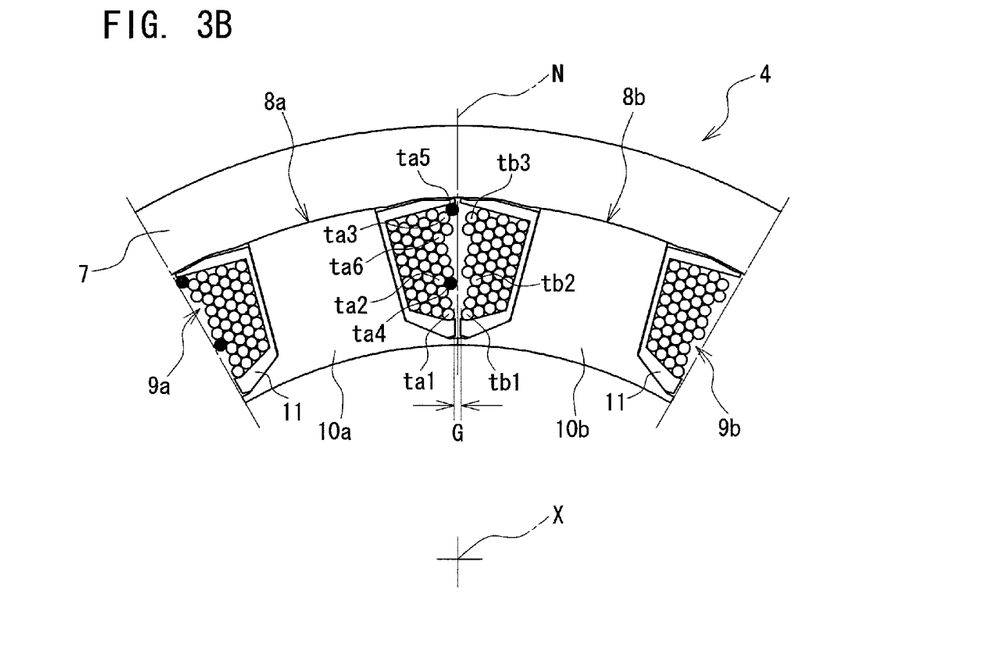
FIG. 3B shows a partial view on a large scale by a cross-section of the axial orthogonal plane of the stator and indicates the stator related to Embodiment 1.

FIGS. 3A and 3B show partial views on large scale of the stator. In FIGS. 3A and 3B, only the two armature coil parts of the same phase are shown upon expansion. FIG. 3A shows a conventional stator 40, while FIG. 3B shows the stator 4 related to Embodiment 1.

In FIG. 3A, armature coil 80a at the left side and armature coil 80b at the right side are of the same phase. In the armature coil 80a, a coil 90a is wound on teeth 100a in order and in layers. In the armature coil 80b, a coil 90b is wound on a tooth 100b in order and in layers. A branch line (gap center line) N indicated as a dashed line is a virtual straight line dividing the armature coil 80a and the armature coil 80b with a gap. The branch line N divides the gap between the tooth 100a and the tooth 100b in half, radially extending from the center of the circle of the stator 40 (that is, the central axis X of the motor).

In the same manner, the left armature coil 8a and the right armature coil 8b are of the same phase in FIG. 3B. In the armature coil 8a, the coil 9a is wound around in order and in layers on the tooth 10a. In the armature coil 8b, the coil 9b is wound around in order and in layers on the tooth 10b. The branched line (gap center line) indicated as a dashed line N is a virtual straight line dividing the armature coil 8a and the armature coil 8b. The branch line N divides the gap between the tooth 10a and the tooth 10b in half, radially extending from the center of the circle of the stator 4 (that is, the central axis X of a motor 1).

In the conventional stator 40 shown in FIG. 3A, the number of turns of the coil 90a and the coil 90b are the same. Moreover, the winding shape of the coil 90a (enveloped cross-sectional shape) and the winding shape of the coil 90b (enveloped cross-sectional shape) are the same. Accordingly, the cross-sectional shape of the coil 90a and the cross-sectional shape of the coil 90b are axially symmetrical with the branch line N in between.

The gap G between the turn of adjacent coils 90a and 90b is the predetermined distance or more. The gap G is the minimum distance between the two adjacent coils 90a and 90b. In the stator 40, a yoke 70, the armature coil 80a, and 80b, and the like are fixed by the filler. A polyester resin or a epoxy resin, and the like may be used as exemplary fillers. When this gap G is too small, the filler cannot flow inside, and it becomes difficult to ensure sufficient electrical insulation between the turn of the coil 90a and the turn of the coil 90b. The gap G should be the predetermined distance or more in order that the filler flows inside. The predetermined distance or more is 0.2 mm or more when the filler is polyester resin, for example.

In FIG. 3A, the gap G is the gap between the turns ta1 and tb1 which are the closest to the central axis X. Here, for example, it is determined that the gap is G=0.6 mm. The turns of the respective coils 90a and 90b are laminated such that layers are formed along the shape of the bobbin; consequently, the gaps are not constant at all turns. For example, the gap between turns ta2 and tb2 and the gap between turns ta3 and tb3 are larger than the gap G.

In FIG. 3B, the respective turns ta4 and ta5 are newly added to the coil 9a at the outer layer of turns ta2 and ta3, that is, the side closer to turns tb2 and tb3. In this manner, even when turns ta4 and ta5 are added to the coil 9a side, the gap between turns ta4 and tb2 or the gap between turns ta5 and tb3 will not become less than the gap in which G=0.6 mm.

In Embodiment 1, the number of turns of the coil 9a is increased by two turns without changing the number of turns of the coil 9b. Thereby, the torque characteristic of the motor 1 is enhanced. Nevertheless, the minimum distance between turns on the adjacent coils is the gap G between turns ta1 and tb1, which still remains 0.6 mm. The number of turns is different between the adjacent coils 9a and 9b, and moreover, the winding shape of the coil 9a and that of the coil 90b is different. There is no trouble if the total number of turns between each phase of phase U, phase V, and phase W is the same. The armature coils 8a 8b are of the same phase, so the total number of turns of these two coils 8a and 8b and the total number of turns of the plurality of coils configuring the other layer should be the same.

Furthermore, as in FIG. 3B, by means of adding the turns ta4 and ta5, the turn ta5 (the first predetermined turn) becomes the closest to the branch line N among the turns on the coil 9a. The turn is not present in the axially symmetrical location of the coil 9b side corresponding to the turn ta5. The turn tb1, the closest to the branch line N in the coil 9b side is not in the axially symmetrical location with the turn ta5 with respect to the branch line N.

Meanwhile, in FIG. 3B, the turn tb2 (the second predetermined turn) is the furthest away from the branch line N from among the turns of the outermost layer of the coil 9b. The turn ta4 is arranged to the anterior of the turn ta2 of the coil 9a side corresponding to this turn tb2; that is, the turn ta4 is located on the side close to the branch line N. The turn ta6 is located the furthest away from the branch line N from among the turns of the outermost layer (the turn facing the branch line N) of the coil 9a. The turns ta6 and tb2 are not axially symmetrically located with respect to the branch line N.

Embodiment 2

Embodiment 1 describes an example of increasing the number of turns of the coil 9a by two turns and enhancing the space factor without changing the gap G with respect to the conventional art. Embodiment 2 describes a case in which the gap G is expanded with respect to the conventional art without changing the total number of turns of the two coils in the same phase.

Figure 4A:
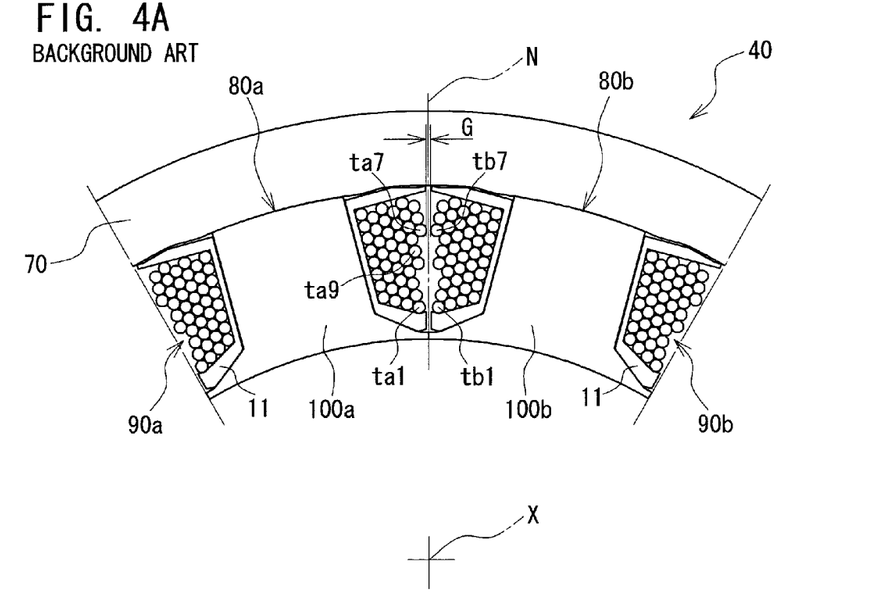
FIG. 4A shows a partial view on a large scale by a cross-section of the axial orthogonal plane of the stator and indicates a conventional stator.
Figure 4B:
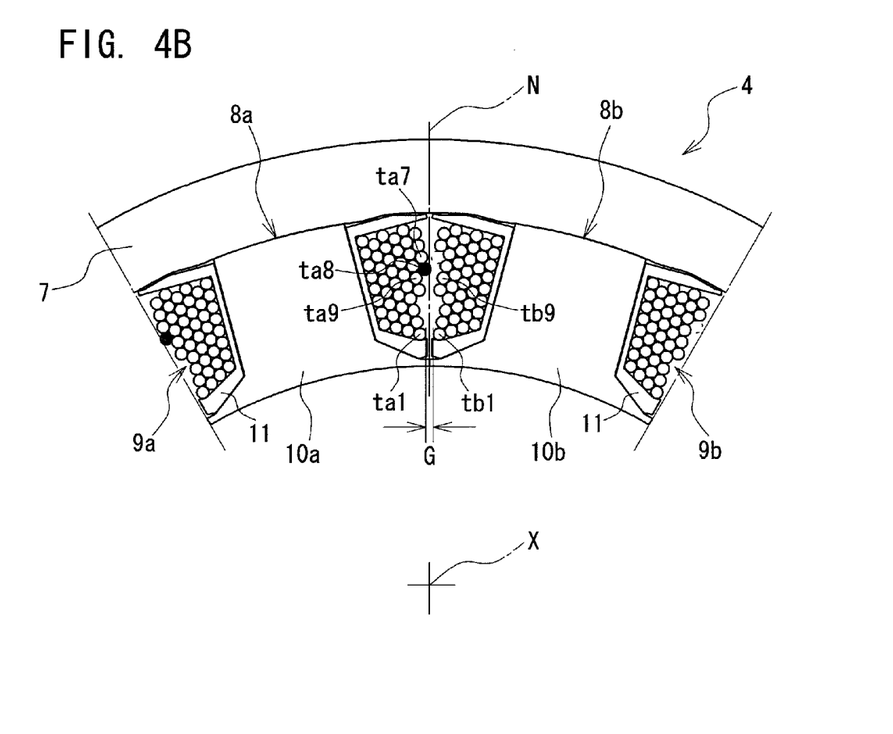
FIG. 4B shows a partial view on a large scale by a cross-section of the axial orthogonal plane of the stator and indicates the stator related to Embodiment 2.

FIGS. 4A and 4B show partial views on the large scale of the stator. In FIGS. 4A and 4B, only the two armature coils of the same phase are indicated upon expansion. FIG. 4A indicates the conventional stator 40, while FIG. 4B indicates the stator 4 related to Embodiment 2. Furthermore, regarding configurations that are the same as in Embodiment 1, the same numbers are attached and descriptions thereof are abbreviated.

In FIG. 4A, the coils 90a and 90b have the same number of turns and the same winding shape. That is, the coils 90a and 90b are axially symmetrical with the branch line N as the axis of symmetry. The turn ta7 of the coil 90a side and the turn tb7 of the coil 90b side are located at the closest position to the branch line N. The gap G between turns ta7 and tb7 is the smallest, for example, 0.35 mm.

In FIG. 4B, there is no turn tb7 on the coil 9b side, and the turn ta8 is added on the coil 9a side. The total number of turns of the coils 9a and 9b does not change. There is no turn corresponding to the turn ta7 on the coil 9b side, so this gap is not the minimum distance between coils 9a and 9b. Moreover, the turn ta8 is added next to the turn ta7 on the coil 9a side, at the closer side to the branch line N than the turn ta9. The distance between turns tb9 and ta8 on the coil 9b side corresponding to the turn ta9 is bigger than the distance between turns ta1 and tb1. The minimum distance between coils 9a and 9b is the gap G between turns ta1 and tb1, which is 0.6 mm.

In this manner, in Embodiment 2, unlike the conventional art, one turn is deleted from the coil 9b, one turn is added to the coil 9a, and the coils 9a and 9b have different number of turns as well as different winding shapes. The coils 9a and 9b are not axially symmetrical with respect to the branch line N. However, the total number of turns on the coils 9a and 9b are the same as the conventional art, with hardly any negative influence on the torque characteristics of the motor. Also, the gap G between coils 9a and 9b expands from 0.35 mm to 0.6 mm. The flow of the filler improves and the isolation from adjacent coils becomes more certain.

Embodiment 3

Embodiment 3 is an example of enhancing the space factor by increasing the number of turns on the coil 9a without changing the gap G with respect to the conventional art. In Embodiment 3, the number of turns in the coil 9a is increased by three turns; the number of turns in the coil 9b is reduced by one turn, and increased by two turns with regard to the total number in the coils 9a and 9b.

Figure 5A:
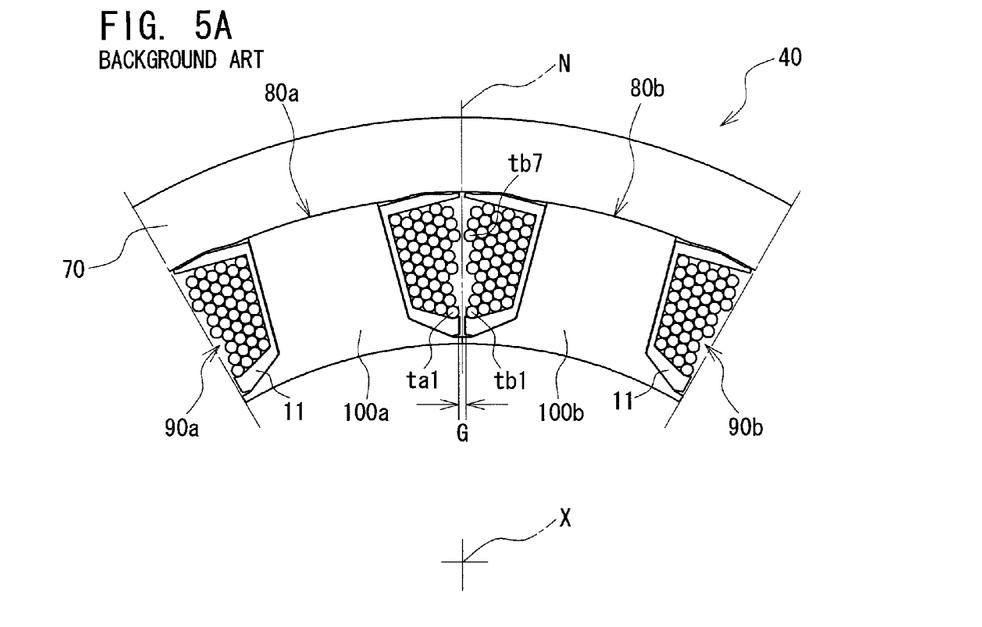
FIG. 5A shows a partial view on a large scale by a cross-section of the axial orthogonal plane of the stator and indicates a conventional stator.
Figure 5B:
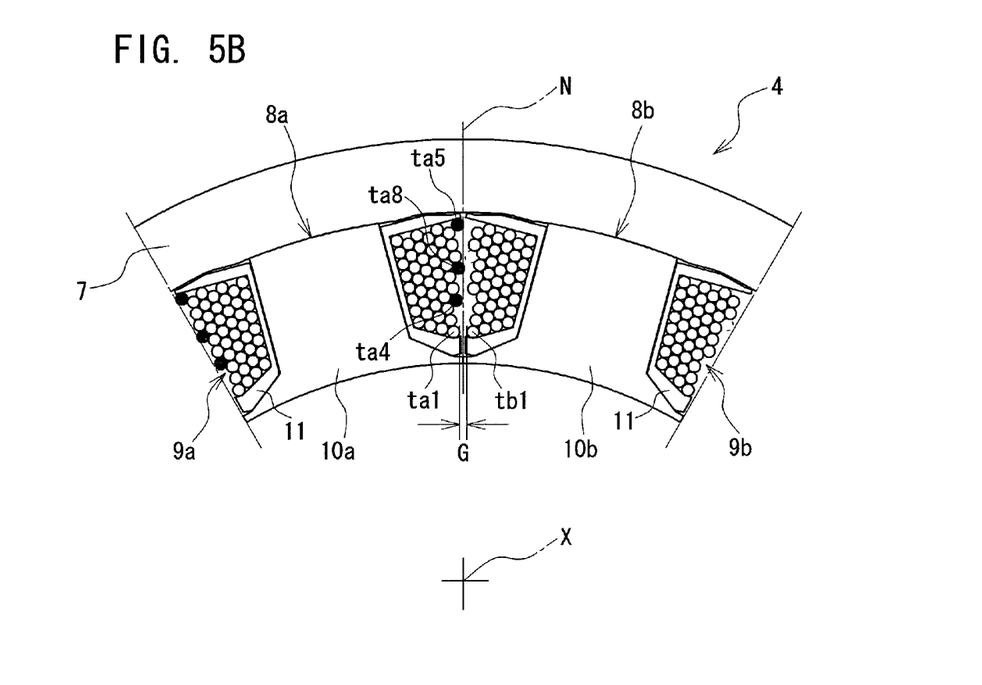
FIG. 5B shows a partial view on a large scale by a cross-section of the axial orthogonal plane of the stator and indicates the stator related to Embodiment 3.

FIGS. 5A and 5B show partial views on the large scale of the stator. In FIGS. 5A and 5B, only the two armature coils of the same phase are indicated upon expansion. FIG. 5A indicates the conventional stator 40, while FIG. 5B indicates the stator 4 related to Embodiment 3. Furthermore, regarding configurations that are the same as in Embodiments 1 and 2, the same numbers are attached and descriptions thereof are abbreviated.

In FIG. 5A, the number of turns and the winding shape of the coils 90a and 90b are the same. That is, the coils 90a and 90b are axially symmetrical with the axis of symmetry as the branch line N. The turn ta1 of the coil 90a side and the turn tb1 of the coil 90b side are arranged at the closest location to the branch line N. The gap G between turns ta1 and tb1 is minimal, for example, 0.6 mm. These turns ta1 and tb1 are at the closest position to the central axis X from among the turns.

In FIG. 5B, in the same manner as in Embodiment 1, the turns ta4 and ta5, which are not present on the coil 9b side, are respectively added to the coil 9a. Furthermore, the turn tb7 in the coil 9b side is deleted, and the turn ta8 is added to the coil 9a side. The place to which the turns ta4 and ta5 are added is the same as in Embodiment 1. The location at which the turn tb7 is deleted and the location to which the turn ta8 is added are same as that of Embodiment 2. In this Embodiment 3, the gap G between the turns ta1 and tb1 is minimal, for example, 0.6 mm.

Embodiment 4

In Embodiment 4, an example is described of making the gap G larger with respect to the conventional art without changing the total number of turns in the two coils in the same phase. In Embodiment 4, the number of turns in the coil 9a is increased by 3 turns, the number of turns in the coil 9b is reduced by 3 turns, and the gap G is increased from 0.6 mm to 0.85 mm.

Figure 6A:
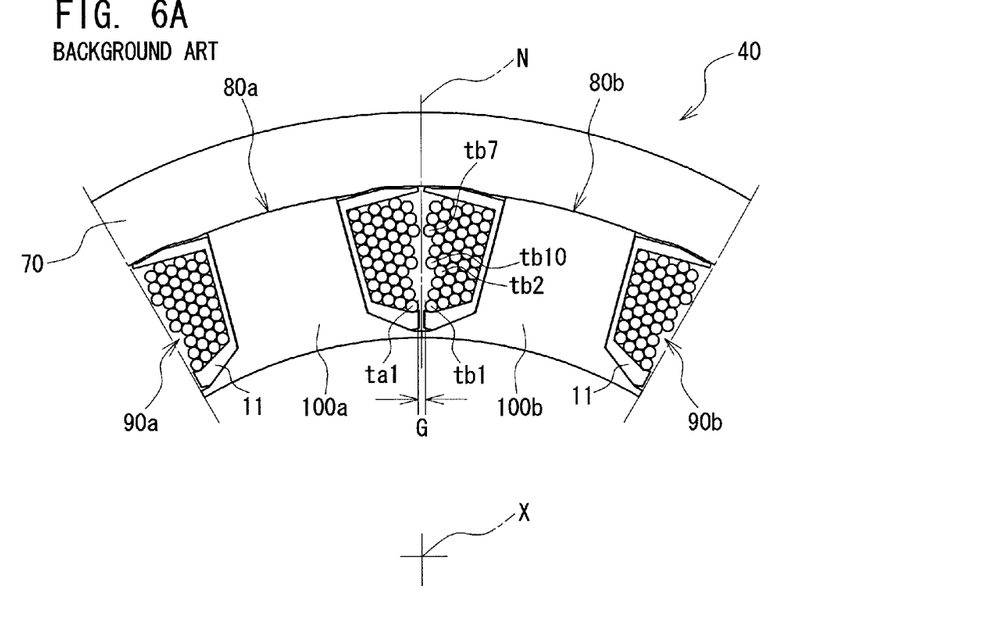
FIG. 6A shows a partial view on a large scale by a cross-section of the axial orthogonal plane of the stator and indicates a conventional stator.
Figure 6B:
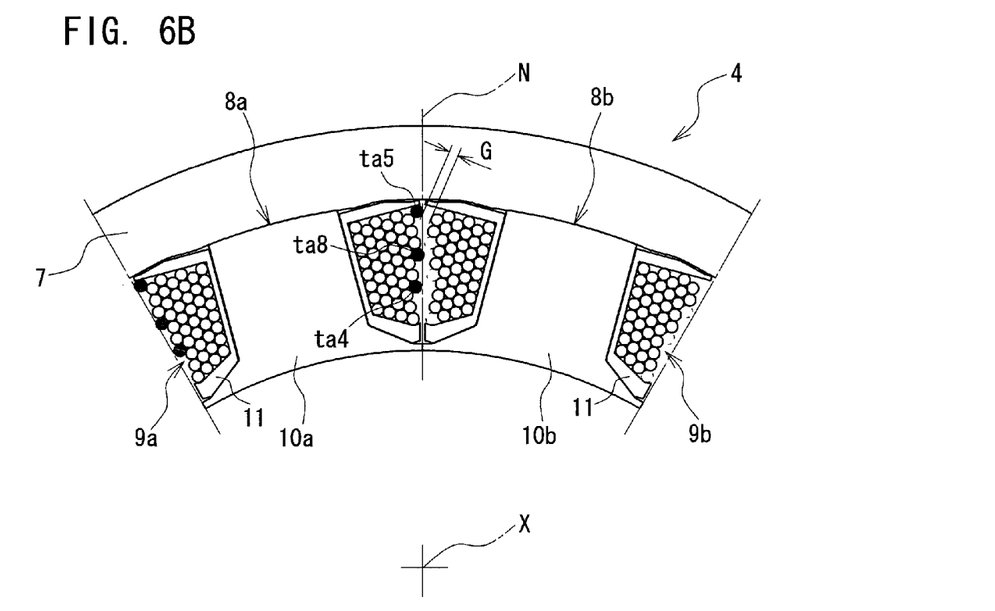
FIG. 6B shows a partial view on a large scale by a cross-section of the axial orthogonal plane of the stator and indicates the stator related to Embodiment 4.

FIGS. 6A and 6B show partial views on the large scale of the stator. In FIGS. 6A and 6B, only the two armature coils of the same phase are indicated upon expansion. FIG. 6A indicates the conventional stator 40, while FIG. 6B indicates the stator 4 related to Embodiment 4. Furthermore, regarding configurations that are the same as in Embodiments 1 to 3, the same numbers are attached and descriptions thereof are abbreviated.

In FIG. 6A, the number of turns and the winding shape of the coils 90a and 90b are the same. That is, the coils 90a and 90b are axially symmetrical with the axis of symmetry as the branch line N. The turn ta1 in the coil 90a side and the turn tb1 in the coil 90b side are arranged at the closest location to the branch line N. The gap G between the turns ta1 and tb1 is minimal, for example, 0.6 mm. These turns ta1 and tb1 are at the closest position to the central axis X from among the turns.

In FIG. 6B, in the same manner as in Embodiment 3, the turns ta4, ta5, and ta8, which are not present on the coil 9b side, are respectively added to the coil 9a. Then, the turns tb1, tb7, and tb10 on the coil 9b side are deleted. The turn tb10 is the turn located on the closer side to the branch line N than the turn tb2. The places to which the turns ta4, ta5, and ta8 are added are the same as those described in Embodiment 3. The place at which the turn tb7 is deleted is the same as that described in Embodiment 2.

In this Embodiment 4, the gap G between the turns ta5 and tb3 is minimum, for example, 0.85 mm. It is more expanded than the gap G=0.6 mm between the conventional turn ta1 and turn tb1. The turn tb1 is not arranged on the coil 9b side, which corresponds to the turn ta1 (in this Embodiment 4, the turn ta1 is the first predetermined turn) on the coil 9a side located on the closest side to the central axis X, and is in an asymmetrical relationship. In this Embodiment 4, the gap G is expanded without changing the total number of turns on the two adjacent coils 9a and 9b of the same phase. Improvement of flowability of the filler and ensuring good insulation characteristics between coils are realized without hardly any negative influence on the torque characteristic of the motor.

As above, the embodiment of the present invention was described; however, the present invention is not limited to this and various arrangements and modifications are possible within the range of the summary thereof.

In the abovementioned embodiments, the rotating electrical machine has been described as a motor (electric motor) 1; however, the rotating electrical machine may be a generator including the rotor 3 and the stator 4 with the same configuration as the motor 1. Moreover, it has been described that the rotor 3 includes 10 poles (the number of field poles) and that there are twelve armature coils 8 of the stator 4 (that is, the number of teeth 10); however, the number of poles and the number of teeth are not limited to this, and other numbers may be appropriately set.

The motor is not limited to the outer stator (inner rotor) type explained in the embodiment. It may be an inner stator (outer rotor) type motor. The armature coil 8 is not limited to those configured from the division core. The armature coil 8 may be seriately configured from a ring-shaped core including a plurality of teeth.

When the gap between two adjacent teeth is divided into half and the straight line radially extending from the center of the circle of the stator is defined as the spacing centerline, the first predetermined turn on one coil from among the two coils is arranged at a closer position to the spacing centerline than any other turns in the one coil and, on the other coil from among the two coils, the turn does not need to be arranged in the axially symmetric position with the spacing centerline as the axis of symmetry with respect to the first predetermined turn.

The first predetermined turn may be arranged closer to the center of the circle than any other turns on the other coil.

When the spacing between two adjacent teeth is divided into half and the straight line radially extending from the center of the circle of the stator is defined as the spacing centerline, the position of the turn arranged the closest to the spacing centerline in one coil from among the two coils and the position of the turn arranged the closest to the spacing centerline in the other coil from among the two coils do not need to be located in the axially symmetric position with the spacing centerline as the axis of symmetry.

When the gap between two adjacent teeth is divided into half and the straight line radially extending from the center of the circle of the stator is defined as the gap centerline, the second predetermined turn in one coil from among the two coils is arranged at the closest position to the spacing centerline than any other turns on the other coil, and in the other coil from among the two coils, the turn may be positioned closer to the spacing centerline than the axially symmetrical position with the spacing centerline as the axis of symmetry with respect to the second predetermined turn.

When the gap between two adjacent teeth is divided into half and the straight line radially extending from the center of the circle of the stator is defined as the gap centerline, the position of the turn arranged the furthest away from the spacing centerline in one coil from among the two coils and the position of the turn arranged furthest away from the spacing centerline in the other coil from among the two coils does not need to be in the axially symmetric position with the spacing centerline as the axis of symmetry.

In the stator, the plurality of coils configure the plurality of phases with alternately different phases having the adjacent plurality of coils among them as the same phase, the two coils are in the same phase, and the total number of turns of the plurality of coils in the same phase is the same between a plurality of phases. In this case, the number of turns of the respective coils in the same phase may be different. Moreover, the gap between the turn and the turn of the two coils may be the predetermined gap determined in advance or more.

Obviously, numerous modifications and variations of the present invention are possible in light of the above teachings. It is therefore to be understood that within the scope of the appended claims, the invention may be practiced otherwise than as specifically described herein.

What is claimed is:

1. A rotating electrical machine comprising a stator and a rotator located inside or outside the stator,
    wherein the stator comprises:
        a plurality of teeth radially extending from the center of a circle of the stator; and
        a plurality of coils that are arranged in order and in layers by winding wire turn plural times around the circumference of the respective plurality of teeth,
    wherein the number of turns on each of two coils arranged on the circumference of two adjacent teeth is different,
    wherein a gap of two adjacent teeth is divided into half and the straight line radially extending from the center of the circle of the stator is defined as the gap centerline,
    wherein a position of the turn arranged closest to the gap centerline in one coil from among the two coils and the position of the turn arranged closest to the gap centerline in the other coil from among the two coils are not in an axially symmetric position with the gap centerline as the axis of symmetry, and
    wherein in the stator:
        the plurality of coils configure a plurality of phases with alternately different phases having the adjacent plurality of coils among them as the same phase, and
        the two coils are in the same phase and the total number of turns on the plurality of coils in the same phase is the same between a plurality of phases.

2. The rotating electrical machine according to claim 1, wherein:
    a first predetermined turn in one coil from among the two coils is arranged at a closer position to the gap centerline than any other turns in the one coil, and
    in the other coil from among the two coils, the turn is not arranged in the axially symmetric position with the gap centerline as the axis of symmetry with respect to the first predetermined turn.

3. The rotating electrical machine according to claim 2, wherein
    the first predetermined turn is located at a closer location to the circle center compared to any other turns on the other coil.

4. The rotating electrical machine according to claim 1, wherein:
    the position of the turn arranged furthest away from the gap centerline in one coil from among the two coils and the position of the turn arranged furthest away from the gap centerline in the other coil from among the two coils are not in the axially symmetric position with the gap centerline as the axis of symmetry.

5. The rotating electrical machine according to claim 1, wherein:
    a second predetermined turn in one coil from among the two coils is arranged at a farther position to the gap centerline than any other turns on the one coil; and
    in the other coil from among the two coils, the turn is positioned closer to the gap centerline than the axially symmetrical position with the gap centerline as the axis of symmetry with respect to the second predetermined turn.

6. The rotating electrical machine according to claim 1, wherein the gap between two turns on the two coils is at a predetermined gap or more.

7. The rotating electrical machine according to claim 1, wherein a filler is filled between the gap and the two coils are fixed by the filler.

8. The rotating electrical machine according to claim 1, wherein the rotating electrical machine is a motor.

9. The rotating electrical machine according to claim 1, wherein the rotating electrical machine is a generator.

* * * * *